March 29, 1932.  A. THOMAS  1,851,412
BLADE FOR SICKLE BARS
Filed March 1, 1928
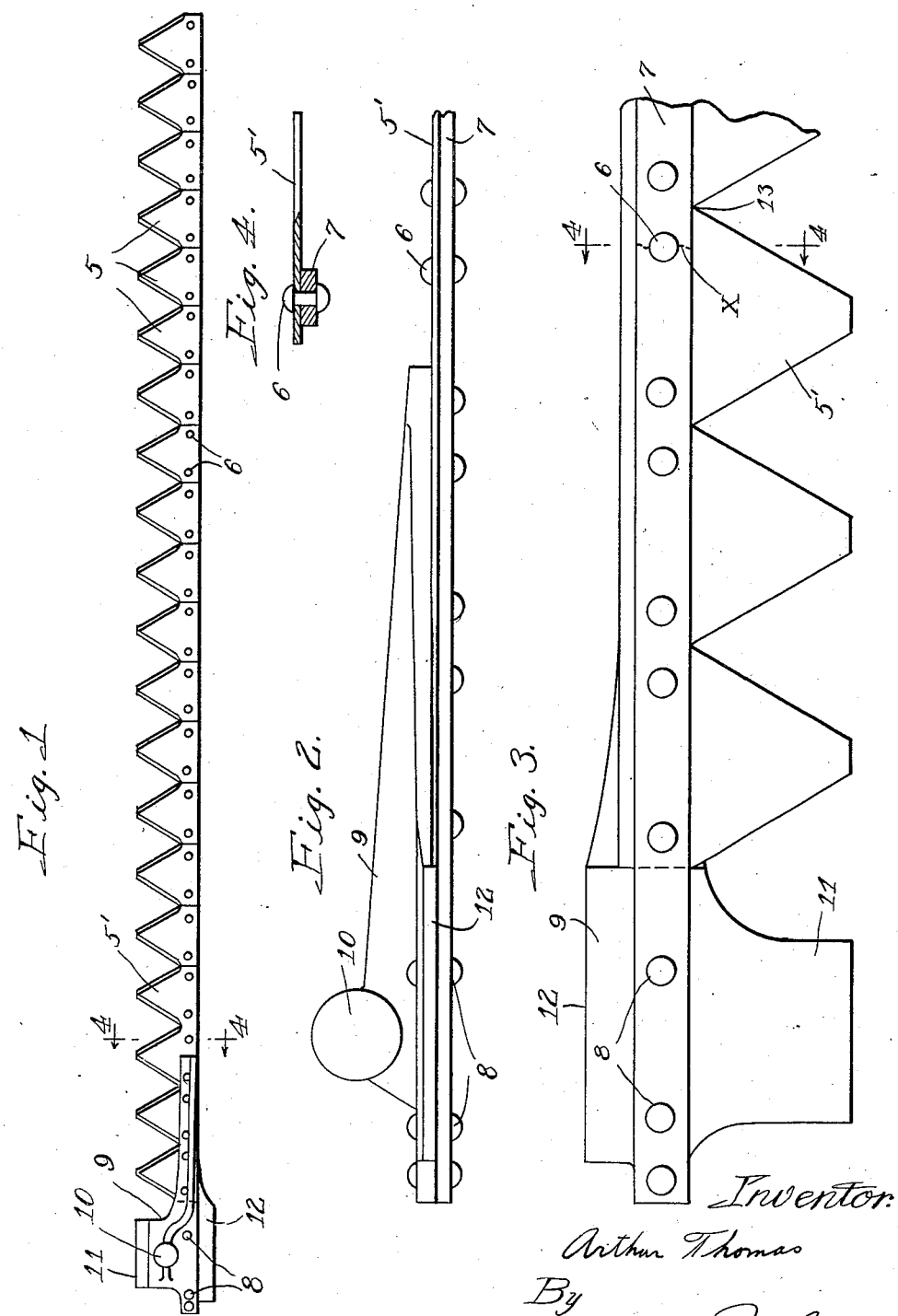
Inventor:
Arthur Thomas
By
Wilson & McCanna
Attys.

Patented Mar. 29, 1932

1,851,412

UNITED STATES PATENT OFFICE

ARTHUR THOMAS, OF BRAYMER, MISSOURI, ASSIGNOR OF ONE-HALF TO CHARLES S. THOMAS, OF SAN DIEGO, CALIFORNIA

BLADE FOR SICKLE BARS

Application filed March 1, 1928. Serial No. 258,224.

This invention relates to improvements in sickle bars for mowing or harvesting machines and has particular reference to a new form of blade arranged to be applied to a sickle bar in a novel manner when the same has been broken, whereby not only to make the sickle bar serviceable again but even stronger at the point where it failed than it formerly was.

Sickle bars are generally made up of single prong blades or teeth riveted individually on a long narrow rod extending the length of the bar and having a head riveted on the one end thereof for reciprocation in a guide provided in the finger bar. The rod is rather small in cross-section and so frail, especially at the rivet holes, that when a jam occurs by reason of one or more of the blades encountering sticks or rocks, a failure is almost bound to occur, especially on the pull stroke of the bar. Experience has shown that about 95% of the breaks occur at the operated end of the bar, that is, at the head, this being the point where the greatest strain is imposed on the rod, and the rod invariably breaks at one of the rivet holes. It has been customary to weld the rod at the break, rerivet the blade, and put the sickle bar back into service. However, once a sickle bar was repaired in that way, it was a matter of only a short time when a failure would occur again inasmuch as the bar was a lot weaker after repair than before. Now, according to my invention I provide a novel form of blade especially designed for use in making repairs of the kind referred to, which, by reason of the fact that it is long enough to span the point where the break occurred, is arranged to give reenforcement to such an extent that the sickle bar is at least as strong after the repair as it was before the break occurred, if not stronger. It will be evident, of course, that the invention is not particularly limited to use as a repair means for sickle bars, inasmuch as a blade of the present character may be inserted at the head end of the bar in the assembling thereof at the factory.

The invention is illustrated in the accompanying drawings, wherein—

Figure 1 is a view of a sickle bar showing the application of the blade of my invention at the head end thereof;

Fig. 2 is a view on an enlarged scale of the head end of the bar looking at the back thereof;

Fig. 3 is an under side view of Fig. 2; and

Fig. 4 is a section taken on the line 4—4 of either Fig. 1 or Fig. 3, looking in the direction of the arrows.

The same reference numerals are applied to corresponding parts throughout the views.

Sickle bars for mowing or harvesting machines, as above stated, are made up of a plurality of single prong blades or teeth 5 riveted by the butt portions thereof, each by a pair of rivets 6, as shown, to a small rod 7 extending the length of the bar and suitably riveted at one end, as at 8, to a head 9. The latter has the usual projecting boss 10 for swivel connection with the pitman rod for reciprocating the sickle bar in its guide on the finger bar. The head also has laterally projecting flanges 11 and 12 arranged to be received in guideways at the end of the finger bar to assume the vertical thrust incident to the operation of the sickle bar by the pitman rod, as is well known in the art. The blades 5 are, of course, individually removable and replaceable when they are worn out or have become badly chipped or are broken off. It has been found that when a jam occurs by reason of one or more of the blades encountering sticks or rocks, especially on the pull stroke of the sickle bar, the rod 7 breaks almost invariably at point $x$, indicated by a dotted line in Fig. 3, at the endmost rivet 6 on the rod, that is, right next to the head 9. In fact, 95% of the failures have been found to occur at the point referred to, the reason undoubtedly being that the greatest stress occurs at that point. It has been customary to weld the pieces of the rod 7 together, rerivet the blade at the weld, and put the sickle bar back into service. However, a break was much more apt to occur after a repair of that kind had been made than was the case before. The construction of the sickle bar and its guide on the finger bar would not permit of the application of any additional strengthening piece to reenforce the bar at the weld. According to my invention the sickle bar can be repaired and reenforced to a substantial degree without the use of an extra reenforcing member, and in such a way that it is not altered in form or size, but will fit in and operate precisely as before in its regular guide in the finger bar, the said means comprising a special blade giving a reenforcement equal in strength almost to the rod 7 itself. Referring to the drawings, a blade provided in accordance with my invention is shown at 5' riveted in place at the head end of the bar spanning the point where the rod 7 has been mended. I prefer to use a blade having four prongs but any blade of two prongs or more may be employed, so that the blade is long enough to bring one or more prongs on either side of the weld. It may be possible to even dispense with the welding of the rod and rely on the strength of the blade itself to mend a broken bar, although ordinarily it will probably be deemed advisable to weld the pieces of the rod together. The amount of reenforcement resulting from the use of a special blade of this kind obviously is determined by the section of the blade through its weakest point, namely, at the crotch 13 between two adjoining prongs, and even at this point the blade is of sufficient section, as compared with the rod 7, to give reenforcement equal to anywhere from fifty to one hundred percent, depending, of course, on the thickness of the blade used. When a sickle bar has been repaired by the removal of one or more single prong blades on one side of the point where the rod 7 has been broken and by the removal of enough blades on the other side to permit the substitution of my special blade, and the rod has been welded before the blade is riveted in place thereon, it will be found that the sickle bar is just as strong as it was before the failure occurred, if not stronger. Where the special blade forms a part of the sickle bar as it leaves the factory, it gives sufficient reenforcement that a failure will not be apt to occur except only in an extreme cases of jamming; the bar is so much stronger at the head end by virtue of the reenforcement afforded by the blade that the heaviest strains can be imposed without resulting in damage.

It is believed the foregoing description conveys a clear understanding of my invention. It should be understood, as stated before, that while special reference has been made to the use of my invention as a highly advantageous form of means for repairing broken sickle bars, and that the same will ordinarily be used at the head end of the bar, where most failures are found to occur, the invention is not limited to use in the specific manner described, inasmuch as the same may be used to good advantage in the manufacture of sickle bars as a means simply of reenforcing the same to prevent failure under the circumstances herein noted and might also be employed in the repairing of breaks occurring at points other than at the head end of a sickle bar. For these reasons the appended claims have been drawn with a view to covering all legitimate modifications, adaptations, or variations of the invention.

I claim:

1. In a sickle bar, the combination with a longitudinal member having a plurality of single prong blades fastened thereto separately by their butt portions to permit individual removal and replacement, of a blade section having an elongated butt portion equivalent in span to the butt portions of two or more of the aforesaid single prong blades and arranged to be secured by its butt portion to the longitudinal member in place of two or more of the aforesaid blades.

2. In a sickle bar, the combination with a longitudinal member having a plurality of single prong blades fastened thereto separately by their butt portions to permit individual removal and replacement, of a blade section having two or more prongs on a correspondingly elongated butt portion, said blade section being arranged to be secured by its butt portion, taking the place of two or more of the aforesaid blades.

3. In a sickle bar, the combination with a longitudinal member for carrying and reciprocating a plurality of blades, and having a plurality of single prong blades fastened thereto separately by the butt portions thereof substantially the full length thereof, each of said blades being individually removable and replaceable in the event of wear or breakage, and a head fastened on one end of said member and arranged to have connection with operating means for reciprocating the bar in a guide provided therefor, of a plural prong blade section having an elongated butt portion corresponding in length to the number of prongs in the blade section, said blade being fastened to the longitudinal member at the head end thereof between the head and the member and with only a portion of the length thereof disposed under the head, whereby the same serves to reenforce the bar at this point.

4. A sickle bar blade adapted for use in the manner herein described, having an elongated butt portion equivalent in span to the butt portions of two or more single blade units, and arranged to be secured by its butt portion in place of two or more of such blades, said blade having sharpened prongs projecting from the butt portion.

In witness of the foregoing I affix my signature.

ARTHUR THOMAS.